(12) United States Patent
Hsu et al.

(10) Patent No.: US 12,190,476 B2
(45) Date of Patent: Jan. 7, 2025

(54) AUTO WHITE BALANCE ADJUSTING METHOD AND AUTO WHITE BALANCE ADJUSTING SYSTEM

(71) Applicant: WELTREND SEMICONDUCTOR INC., Hsinchu (TW)

(72) Inventors: Te-Wei Hsu, Hsinchu (TW); Hsuan-Ying Chen, Hsinchu (TW); Chun-Ying Li, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 396 days.

(21) Appl. No.: 17/887,498

(22) Filed: Aug. 14, 2022

(65) Prior Publication Data
US 2023/0289921 A1    Sep. 14, 2023

(30) Foreign Application Priority Data
Mar. 14, 2022   (TW) .................................. 111109244

(51) Int. Cl.
*H04N 23/88*   (2023.01)
*G06T 5/00*   (2006.01)

(52) U.S. Cl.
CPC ...... *G06T 5/00* (2013.01); *G06T 2207/10024* (2013.01); *G06T 2207/20076* (2013.01)

(58) Field of Classification Search
CPC ............ G06T 5/00; G06T 2207/10024; G06T 2207/20076; H04N 23/88; H04N 9/73; H04N 1/6027; H04N 1/60; G09G 2320/0666
See application file for complete search history.

(56) References Cited

U.S. PATENT DOCUMENTS

| | | | | |
|---|---|---|---|---|
| 10,616,544 | B2 * | 4/2020 | Wang | H04N 23/88 |
| 2009/0046928 | A1 * | 2/2009 | Kwak | H04N 1/608 |
| | | | | 382/167 |
| 2013/0322753 | A1 * | 12/2013 | Lim | G06T 5/73 |
| | | | | 382/167 |
| 2015/0371370 | A1 | 12/2015 | Yao | |

FOREIGN PATENT DOCUMENTS

| | | | | |
|---|---|---|---|---|
| CN | 107959851 A | * | 4/2018 | ............. H04N 17/02 |
| CN | 108877733 A | * | 11/2018 | ............... G09G 5/02 |
| CN | 111669560 A | | 9/2020 | |
| CN | 112492286 A | | 3/2021 | |
| KR | 100987030 B1 | * | 10/2010 | ................ G01J 5/60 |

* cited by examiner

*Primary Examiner* — John Villecco
*Assistant Examiner* — Kyla Guan-Ping Tiao Allen
(74) *Attorney, Agent, or Firm* — Winston Hsu (57) ABSTRACT

An auto white balance adjusting method includes determining a local white pixel area and a global white pixel area, selecting a plurality of pixels of an image according to the local white pixel area for generating a local average color value in a first color space, selecting a plurality of pixels of the image according to the global white pixel area for generating a global average color value in the first color space, converting the local average color value into three primary color gains in a second color space, generating three primary color target gains according to the three primary color gains and a color temperature curve in the second color space, and adjusting a white balance of the image frame by frame to meet the three primary color target gains according to the local average color value and the three primary color gains.

20 Claims, 5 Drawing Sheets

AUTO WHITE BALANCE ADJUSTING METHOD AND AUTO WHITE BALANCE ADJUSTING SYSTEM

BACKGROUND OF THE INVENTION

1. Field of the Invention

The present invention relates to an auto white balance adjusting method and an auto white balance adjusting system, and more particularly, an auto white balance adjusting method and an auto white balance adjusting system for continuously calibrating an image white balance by using dual color spaces.

2. Description of the Prior Art

With the rapid development of technology, various light sensors and image processing methods are applied in our daily life. Light sensors and image processing methods are used for restoring true colors of images under current ambient light. Different environments cause different light sources. Since different light sources have different color temperatures, when an object is illuminated by different light sources, the object may present different colors. The color temperature can be quantized as a "K" value. When the "K" value is decreased, the color of the object becomes reddish in hue. When the "K" value is increased, the color of the object becomes bluish in hue. Therefore, when various light sources are illuminated to the object, the color shift of the object occurs, leading to a severe white balance offset.

In image processing technologies, a purpose of adjusting the white balance is to calibrate the color shift. When the color shift of the image is calibrated, the image can approach its true colors. In general, the color shift of the image is obvious when the color shift of a "white" object occurs. Therefore, the "white color" is usually used as a reference color for eliminating the color shift. However, different cameras have different photosensitive elements and different white balance adjustment processes. Since the red (R), green (G), and blue (B) colors detected by the photosensitive element of the camera are unbalanced under different color temperatures, color distortion is prone to occur. For example, the color temperature of the image is obviously reddish or bluish under specific light sources. Therefore, adjusting the white balance of the image is an important issue for the image processing technology.

Currently, two white balance adjusting methods are commonly used, denoted as gray world algorithm and perfect reflector algorithm. In the gray world algorithm, a drawback is that when the color in the image is relatively monotonous, the white balance adjustment performance may be greatly decreased. In the perfect reflection algorithm, when the brightest area in the image is not absolutely white, the white balance adjustment performance may be greatly decreased. Therefore, to develop an optimized and automatic white balance adjusting method is an important issue.

SUMMARY OF THE INVENTION

In an embodiment of the present invention, an auto white balance adjusting method is disclosed. The auto white balance adjusting method comprises determining a local white pixel area according to a first color temperature curve and a first brightness range of a first color space, determining a global white pixel area according to the first color temperature curve and a second brightness range of the first color space, selecting a plurality of pixels of an image according to the local white pixel area for generating a local average color value of the first color space, the local average color value being corresponding to the local white pixel area, selecting a plurality of pixels of the image according to the global white pixel area for generating a global average color value of the first color space, the global average color value being corresponding to the global white pixel area, converting the local average color value of the first color space into three primary color gains of a second color space, generating three primary color target gains according to the three primary color gains and a second color temperature curve of the second color space, and adjusting a white balance of the image frame by frame to meet the three primary color target gains according to the local average color value of the first color space and the three primary color gains of the second color space. The first color space and the second color space are different.

In another embodiment of the present invention, an auto white balance adjusting system is disclosed. The auto white balance adjusting system comprises an image capturing device, a memory, an output device, and a processor. The image capturing device is configured to acquire an image. The memory is configured to save data. The output device is configured to output an image with an adjusted white balance. The processor is coupled to the image capturing device, the memory, and the output device and configured to control the image capturing device, the memory, and the output device. After the image capturing device acquires the image, the processor determines a local white pixel area according to a first color temperature curve and a first brightness range of a first color space saved in the memory. The processor determines a global white pixel area according to the first color temperature curve and a second brightness range of the first color space saved in the memory. The processor selects a plurality of pixels of an image according to the local white pixel area for generating a local average color value of the first color space. The local average color value corresponds to the local white pixel area. The processor selects a plurality of pixels of the image according to the global white pixel area for generating a global average color value of the first color space. The global average color value corresponds to the global white pixel area. The processor converts the local average color value of the first color space into three primary color gains of a second color space. The processor generates three primary color target gains according to the three primary color gains and a second color temperature curve of the second color space. The processor adjusts a white balance of the image frame by frame to meet the three primary color target gains according to the local average color value of the first color space and the three primary color gains of the second color space. The processor controls the output device for outputting the image with the adjusted white balance. The first color space and the second color space are different.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
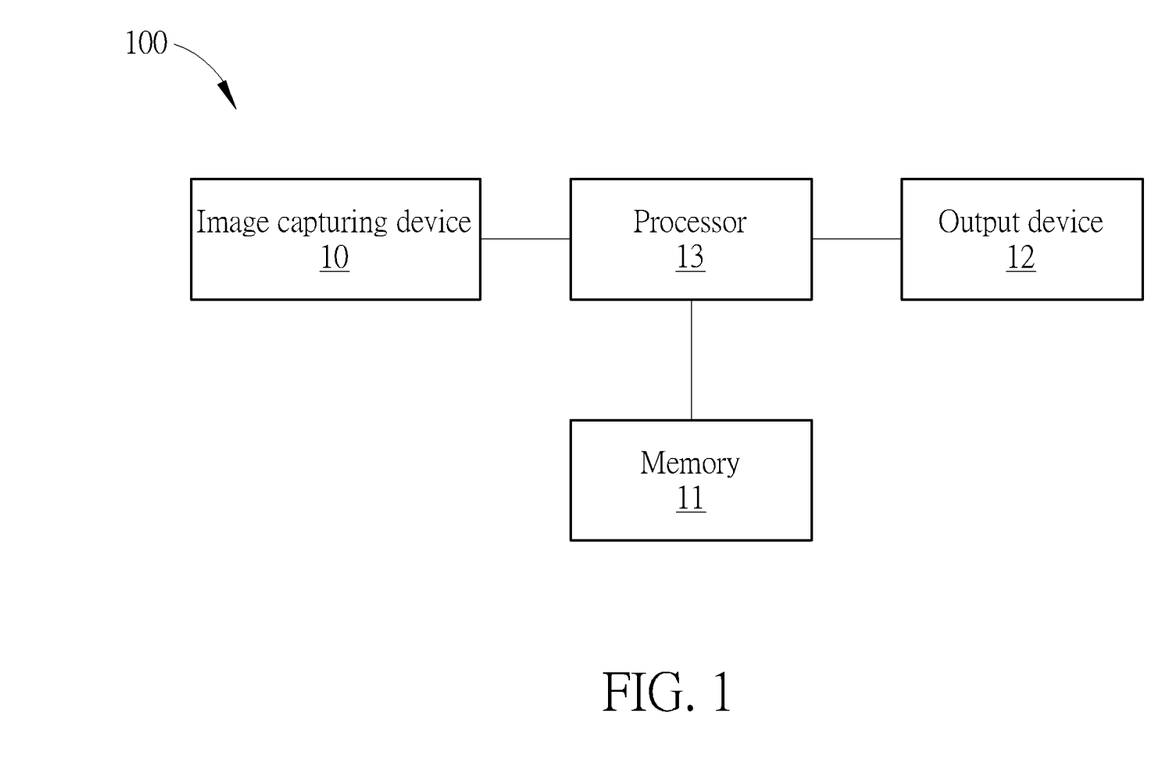
FIG. 1 is a block diagram of an auto white balance adjusting system according to an embodiment of the present invention.

FIG. 1 is a block diagram of an auto white balance adjusting system 100 according to an embodiment of the present invention. The auto white balance adjusting system 100 is capable of continuously calibrating white balance of a color shifted image under various light sources. The auto white balance adjusting system 100 can include an image capturing device 10, a memory 11, an output device 12, and a processor 13. The image capturing device 10 is used for acquiring an image. The image capturing device 10 can be a camera or any device having a photosensitive element. The memory 11 is used for saving data. The output device 12 is used for outputting an image with an adjusted white balance. The output device 12 can be a screen, an image output port, or a projection system. The processor 13 is coupled to the image capturing device 10, the memory 11, and the output device 12 for controlling the image capturing device 10, the memory 11, and the output device 12. The auto white balance adjusting system 100 can adjust the white balance by using information of dual color spaces, thereby leading to high reliability. Further, the auto white balance adjusting system 100 can dynamically adjust a local white pixel area and a global white pixel area for determining an optimal reference white color for increasing the accuracy of automatically adjusting the white balance. In the auto white balance adjusting system 100, after the image capturing device 10 acquires the image, the processor 13 determines a local white pixel area according to a first color temperature curve and a first brightness range of a first color space saved in the memory 11. The processor 13 determines a global white pixel area according to the first color temperature curve and a second brightness range of the first color space saved in the memory 11. The processor 13 selects a plurality of pixels of an image according to the local white pixel area for generating a local average color value of the first color space. The local average color value corresponds to the local white pixel area. The processor 13 selects a plurality of pixels of the image according to the global white pixel area for generating a global average color value of the first color space. The global average color value corresponds to the global white pixel area. The processor 13 converts the local average color value of the first color space into three primary color gains of a second color space. The processor 13 generates three primary color target gains according to the three primary color gains and a second color temperature curve of the second color space. The processor 13 adjusts a white balance of the image frame by frame to meet the three primary color target gains according to the local average color value of the first color space and the three primary color gains of the second color space. The processor 13 controls the output device 12 for outputting the image with the adjusted white balance. The first color space and the second color space are different.

Figure 2:
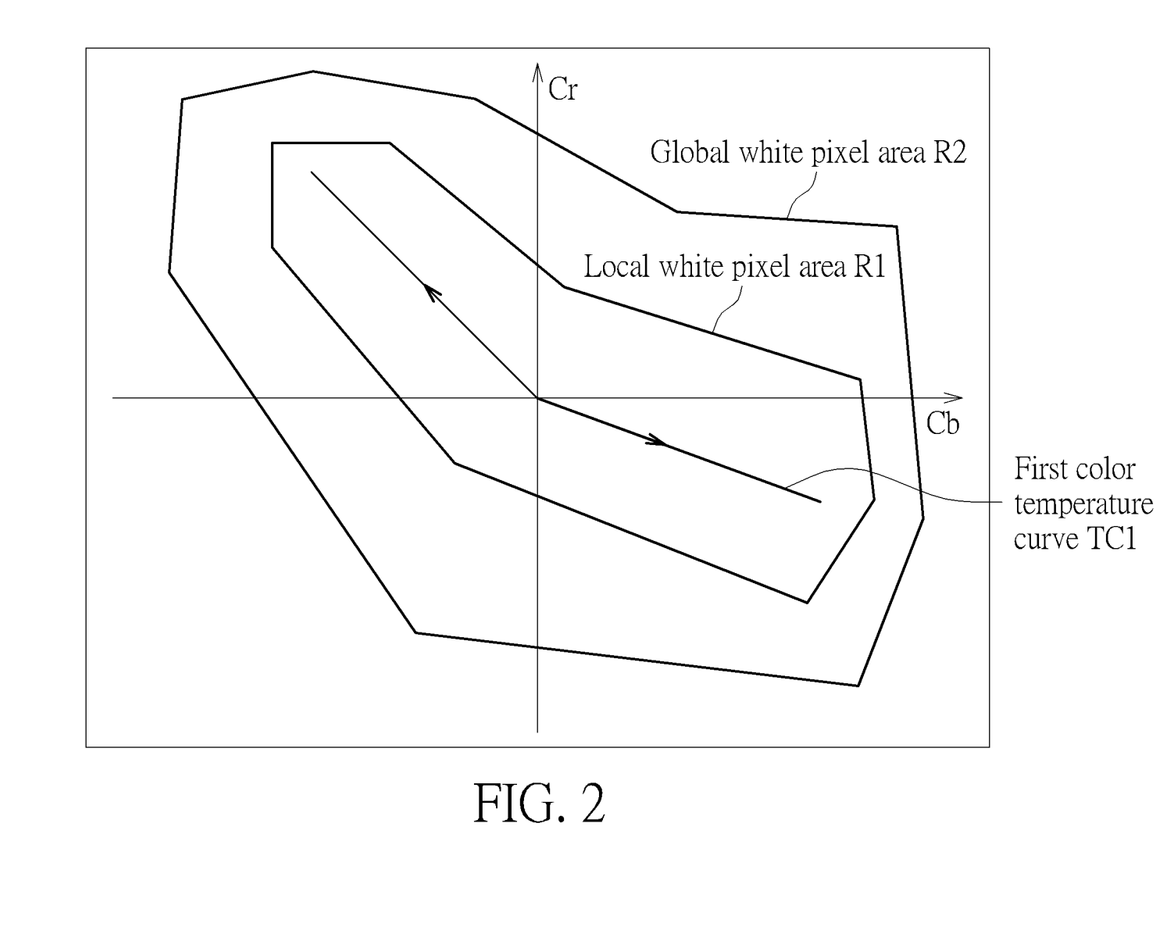
FIG. 2 is an illustration of determining a local white pixel area and a global white pixel area of a first color space of the auto white balance adjusting system in FIG. 1.

FIG. 2 is an illustration of determining a local white pixel area R1 and a global white pixel area R2 of a first color space of the auto white balance adjusting system 100. The first color space can be a Luminance-Chrominance color space (YUV color space). The second color space can be a three primary color space (RGB color space). In the YUV color space, as shown in FIG. 2, Cr is a red chromaticity axis. Cb is a blue chromaticity axis. Therefore, a CrCb table of FIG. 2 can be previously stored in the memory 11. Based on the YUV color space, the processor 13 determines a local white pixel area for a local scene image according to local brightness and color variations of a high color temperature range and a low color temperature range of the first color temperature curve TC1. Such local white pixel area is called as the local white pixel area R1 hereafter. Further, the local white pixel area R1 can be defined by generating an area with any shape and any range around the first color temperature curve TC1. The local white pixel area R1 can also be directly defined. For example, the local white pixel area R1 can correspond to a local brightness range smaller than 100-200 nits. Therefore, the local white pixel area R1 is a three-dimensional (Cr, Cb, Y) local white pixel space. A range of the local white pixel area R1 can affect the accuracy of determining reference white pixels. Similarly, the processor 13 determines a global white pixel area for a global scene image according to global brightness and the color variations of the high color temperature range and the low color temperature range of the first color temperature curve TC1. Such global white pixel area is called as the global white pixel area R2 hereafter. Further, the global white pixel area R2 can be defined by generating an area with any shape and any range around the first color temperature curve TC1. The global white pixel area R2 can also be directly defined. Similarly, the global white pixel area R2 is a three-dimensional (Cr, Cb, Y) global white pixel space. Further, the local white pixel area R1 is within the global white pixel area R2. After the local white pixel area R1 and the global white pixel area R2 are determined, the processor 13 can detect a plurality of corresponding white pixels in the image according to the local white pixel area R1 and the global white pixel area R2. Then, the processor 13 can average color values of Y, U, and V of the plurality of white pixels in the local white pixel area R1 for generating a local average color value (Local $YUV_{NWP}$) of the first color space (YUV color space). Similarly, the processor 13 can average color values of Y, U, and V of the plurality of white pixels in the global white pixel area R2 for generating a global average color value (Global $YUV_{Average}$) of the first color space. Then, the processor 13 can convert the local average color value of the first color space into three primary color gains ($R_{GAIN}$, $G_{GAIN}$, $B_{GAIN}$) of a second color space (RGB color space). In other words, the processor 13 converts the local average color value of the first color space into a red color gain $R_{GAIN}$, a green color gain $G_{GAIN}$, and a blue color gain $B_{GAIN}$ of the second color space. Then, the processor 13 can normalize the red color gain $R_{GAIN}$, the green color gain $G_{GAIN}$, and the blue color gain $B_{GAIN}$. For example, the processor 13 can divide the red color gain $R_{GAIN}$ and the blue color gain $B_{GAIN}$ by the green color gain $G_{GAIN}$.

Figure 3A:
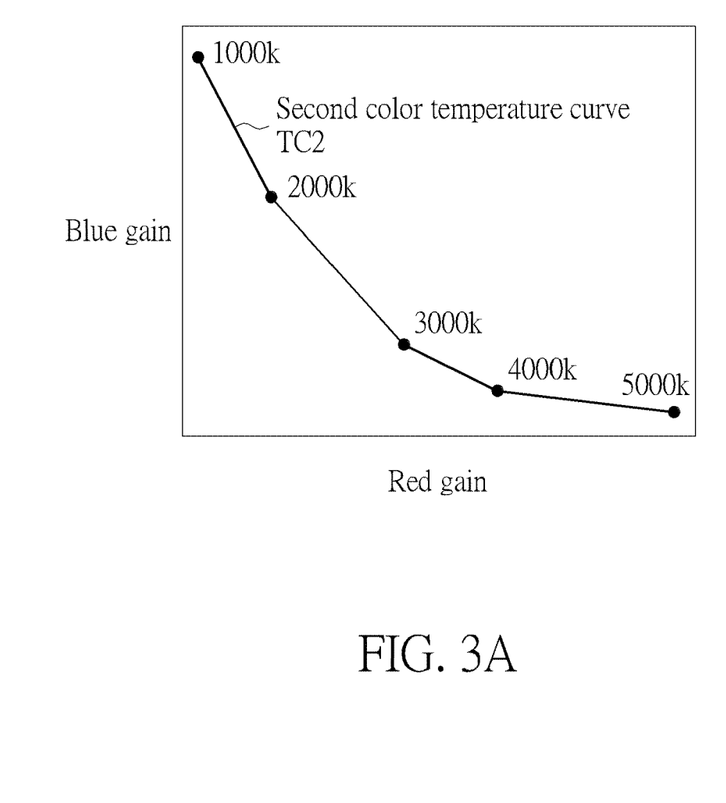
FIG. 3A is an illustration of a second color temperature curve of a second color space of the auto white balance adjusting system in FIG. 1.
Figure 3B:
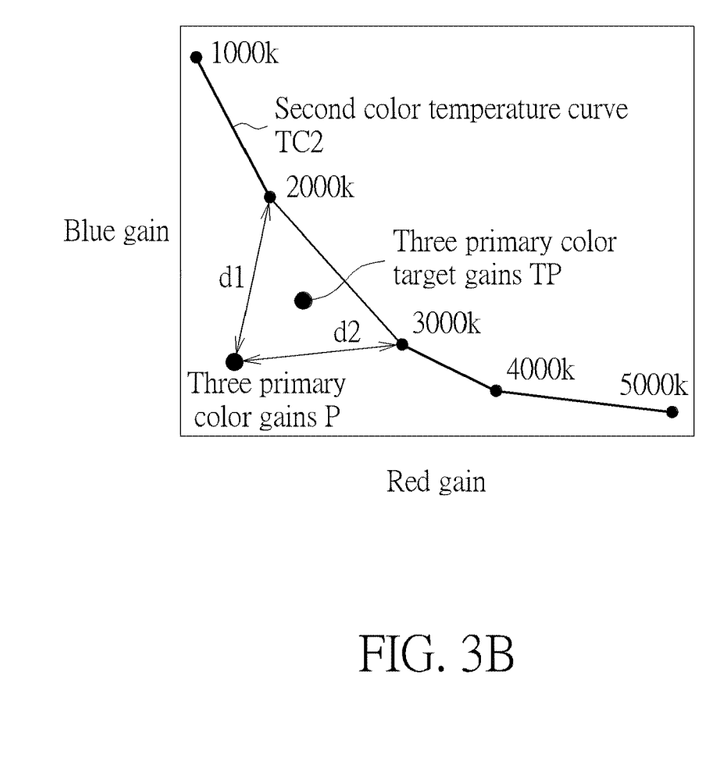
FIG. 3B is an illustration of a correlation among the second color temperature curve, three primary color gains, and three primary color target gains of the auto white balance adjusting system in FIG. 1.
Figure 3C:
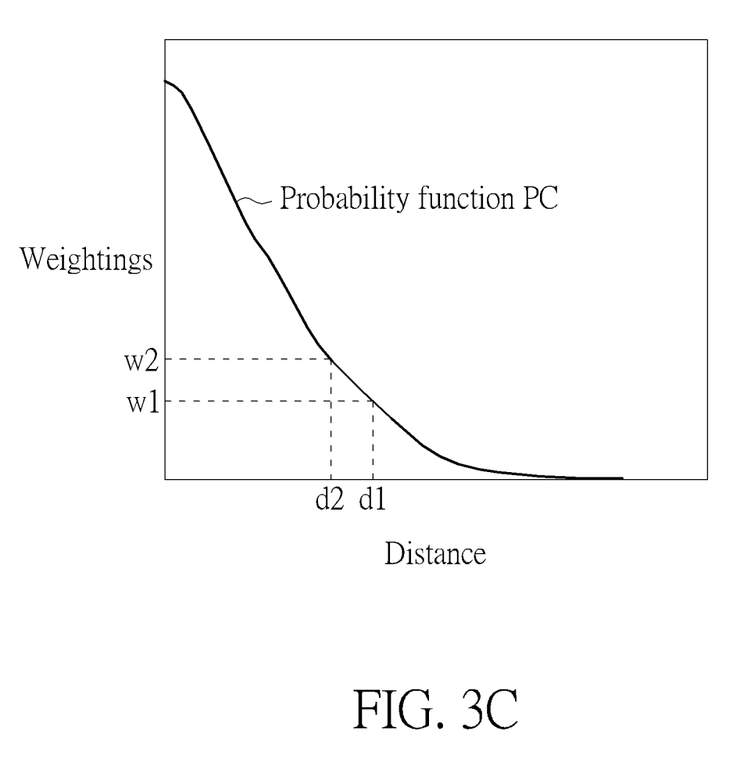
FIG. 3C is an illustration of a correlation among distances, weightings, and a probability function of the auto white balance adjusting system in FIG. 1.

FIG. 3A is an illustration of a second color temperature curve TC2 of the second color space of the auto white balance adjusting system 100. FIG. 3B is an illustration of a correlation among the second color temperature curve TC2, three primary color gains P, and three primary color target gains TP of the auto white balance adjusting system 100. FIG. 3C is an illustration of a correlation among distances, weightings, and a probability function PC of the auto white balance adjusting system 100. In FIG. 3A, based on the second color space, the processor 13 can set a plurality of color temperature intervals according to the second color temperature curve TC2 previously defined. For example, the processor 13 can set "1000K" as a range of the color temperature intervals between color temperatures 1000K and 5000K. In other words, in FIG. 3A, 1000K-2000K can be defined as a color temperature interval. 2000K-3000K can be defined as a color temperature interval. 3000K-4000K can be defined as a color temperature interval. 4000K-5000K can be defined as a color temperature interval. Boundary points of a plurality of color intervals can be connected by a regression algorithm or a linear interpolation algorithm to meet the second color temperature curve TC2. Therefore, the second color temperature curve TC2 can be linear or non-linear. In other words, the second color temperature curve TC2 is formed by a plurality of color temperature range boundary points. X-axis is denoted as a normalized red color gain. Y-axis is denoted as a normalized blue color gain. The second color temperature curve TC2 in FIG. 3A can be regarded as predetermined information saved in the memory 11.

As previously illustrated, the processor 13 can convert the local average color value of the first color space (YUV color space) into three primary color gains of a second color space (RGB color space). Then, the processor 13 can generate three primary color target gains according to the three primary color gains and the second color temperature curve TC2 of the second color space. Details are illustrated below. Since the second color temperature curve TC2 can be formed by the plurality of color temperature range boundary points, as shown in FIG. 3B, the processor 13 can acquire two distances between the three primary color gains P and two nearest color temperature range boundary points of the second color temperature curve TC2. For example, in FIG. 3B, the processor 13 can acquire two nearest color temperature range boundary points corresponding to 2000K and 3000K. A distance between the three primary color gains P and a color temperature 2000K range boundary point can be determined as d1. A distance between the three primary color gains P and a color temperature 3000K range boundary point can be determined as d2. The distance can be an Euler distance, a distance derived according to a square root of an orientation vector, or a distance derived according to an absolute value of the orientation vector. Then, the processor 13 can generate the three primary color target gains TP by linearly combining the three primary color gains P with two nearest color temperature range boundary points according to the two distances (i.e., the distance d1 and the distance d2). The distance d1 is called as a first distance d1 hereafter. The distance d2 is called as a second distance d2 hereafter. For example, the processor 13 can set two weightings w1 and w2 (hereafter, say, the first weighting w1 and the second weighting w2). After the first weighting w1 and the second weighting w2 are linearly combined with the first distance d1 and the second distance d2, coordinates of the three primary color target gains TP can be adjusted proportionally. Further, the first weighting w1 and the second weighting w2 can be acquired according to a look-up table or a probability function PC in FIG. 3C. For example, in FIG. 3C, according to the probability function PC, a weighting corresponds to the first distance d1 is the first weighting w1. A weighting corresponds to the second distance d2 is the second weighting w2.

In the auto white balance adjusting system 100, the "white pixel area" can be adaptively updated, as illustrated below. The processor 13 can set a global white error threshold of the first color space. The processor 13 can acquire a global white error when updating the global average color value while the white balance of the image is adjusted frame by frame. For example, the processor 13 can estimate the global white error between the global average color value and a previous global average color value. The global white error can be derived according to a square root of an error vector or an absolute value of the error vector. When the global white error is equal to or larger than the global white error threshold, it implies that color tones of the image are varied drastically. Therefore, since the color tones of the image are varied drastically, the "original" global white pixel area R2 is inappropriate. Therefore, the processor 13 can enlarge the global white pixel area R2 and the local white pixel area R1 for increasing the number of white pixels according to the global white error. Since the number of white pixels is increased, the accuracy of adjusting the white balance of the image can be improved. Further, the global white pixel area R2 and the local white pixel area R1 can be adjusted according to predetermined parameters or a look-up table.

When the global white error is smaller than the global white error threshold, it implies that the color tones of the image are varied gradually. Therefore, the processor 13 can use a local scene variation detection mode. For example, the processor 13 can set a white pixel (U, V) target value equal to 128 (8-bits) of the first color space. Then, the processor 13 can set a local white error threshold of the first color space. Further, the processor 13 can acquire a local white error between the local average color value and the white pixel target value. When the local white error is decreased, it implies that predicted white balance pixels approach a reference white color. When the local white error is increased, it implies that the predicted white balance pixels are far from the reference white color. Thus, the processor 13 can enlarge the local white pixel area R1 when the local white error is equal to or larger than the local white error threshold. Conversely, the processor 13 can reduce the local white pixel area R1 when the local white error is smaller than the local white error threshold. Similarly, the local white pixel area R1 can be adjusted according to predetermined parameters or a look-up table.

In the auto white balance adjusting system 100, a mechanism of adaptively generating white balance gains (i.e., the red color gain $R_{GAIN}$ f the green color gain $G_{GAIN}$ f and the blue color gain $B_{GAIN}$) can be introduced, as illustrated below. The processor 13 can acquire previous three primary color target gains Curr_TP. Then, the processor 13 can acquire updated weightings $W_{AWB}$. Then, the processor 13 can generate updated gains Update_Gain according to the three primary color target gains TP, the updated weightings $W_{AWB}$, and the previous three primary color target gains Curr_TP.

$$Update\_Gain=(1-W_{AWB}) \times Curr\_TP + W_{AWB} \times TP$$

Here, the updated gains Update_Gain can be derived by linearly combining the three primary color target gains TP with the previous three primary color target gains Curr_TP according to the updated weightings $W_{AWB}$. Further, the updated weightings $W_{AWB}$ can be determined according to a distance between the previous three primary color target gains Curr_TP and the three primary color target gains TP, a look-up table, or a predetermined value. Further, coordinates of the updated gains Update_Gain are within the second color space (RGB). Therefore, the coordinates of the updated gains can be written as (Update $B_{GAIN}$, Update $R_{GAIN}$). Therefore, when the auto white balance adjusting system 100 adjusts the white balance frame by frame, updated components of the blue gain and the red gain can be regarded as the coordinates of the updated gains (Update $B_{GAIN}$, Update $R_{GAIN}$) of the second color space (RGB). Further, an updating frequency for adjusting the white balance of the image by the auto white balance adjusting system 100 can be customized. For example, the auto white balance adjusting system 100 can adjust the white balance of the image every frame or every two frames.

Figure 4:
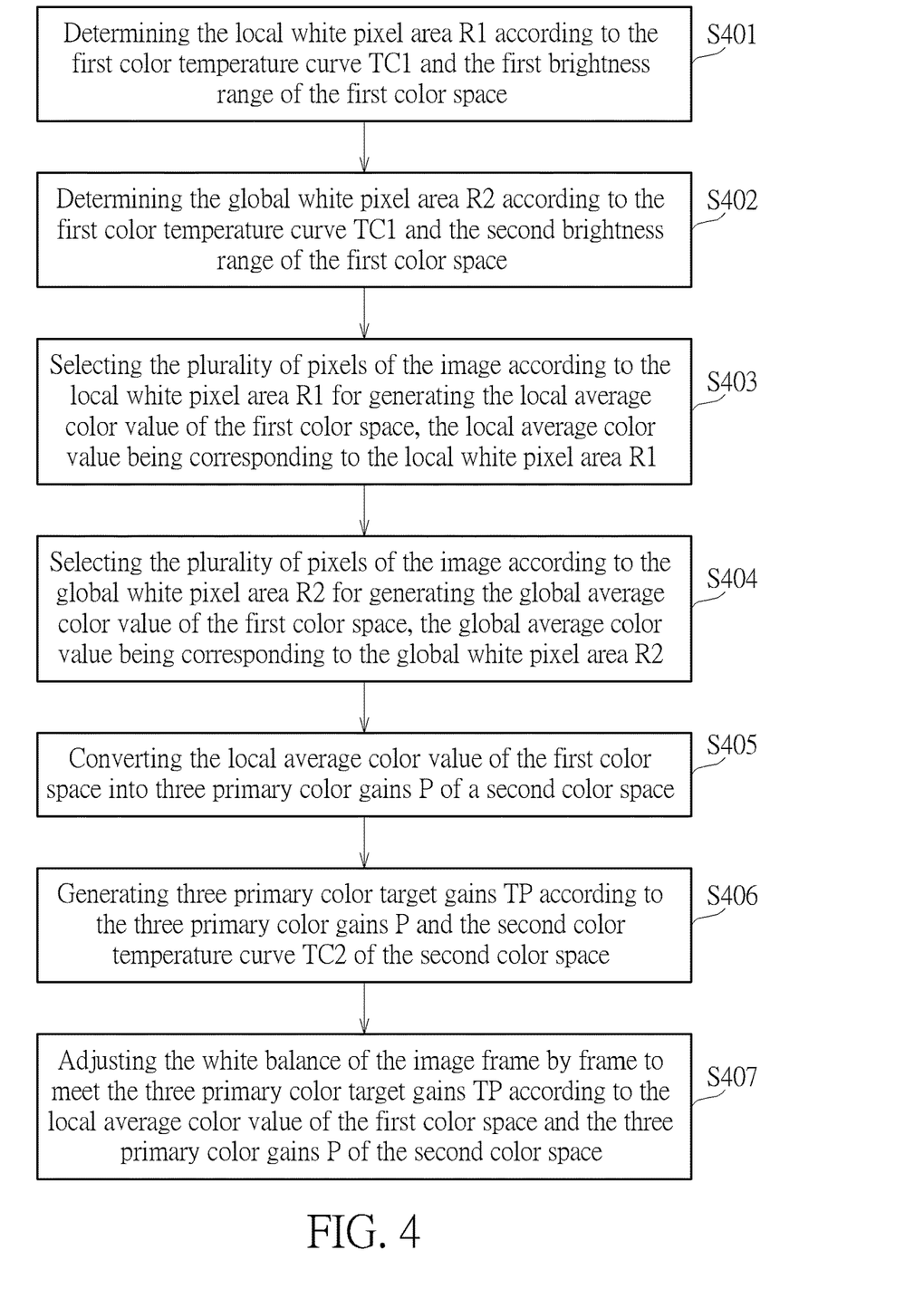
FIG. 4 is a flow chart of performing an auto white balance adjusting method by the auto white balance adjusting system in FIG. 1.

FIG. 4 is a flow chart of performing an auto white balance adjusting method by the auto white balance adjusting system 100. The auto white balance adjusting method includes step S401 to step S407.

Step S401 to step S407 are illustrated below.

step S401: determining the local white pixel area R1 according to the first color temperature curve TC1 and the first brightness range of the first color space;

step S402: determining the global white pixel area R2 according to the first color temperature curve TC1 and the second brightness range of the first color space;

step S403: selecting the plurality of pixels of the image according to the local white pixel area R1 for generating the local average color value of the first color space, the local average color value being corresponding to the local white pixel area R1;

step S404: selecting the plurality of pixels of the image according to the global white pixel area R2 for generating the global average color value of the first color space, the global average color value being corresponding to the global white pixel area R2;

step S405: converting the local average color value of the first color space into three primary color gains P of a second color space;

step S406: generating three primary color target gains TP according to the three primary color gains P and the second color temperature curve TC2 of the second color space;

step S407: adjusting the white balance of the image frame by frame to meet the three primary color target gains TP according to the local average color value of the first color space and the three primary color gains P of the second color space.

Details of step S401 to step S407 are previously illustrated. Thus, they are omitted here. In step S401 to step S407, the auto white balance adjusting system 100 can use two color spaces (i.e., such as the RGB color space and the YUV color space) for adjusting the white balance of the image. The YUV color space can be used for quickly estimating and detecting feedback signals. Further, the RGB color space can be used for quickly searching the three primary target color gains. Further, the auto white balance adjusting system 100 introduces a method for optimizing the white pixel area to improve white balance adjusting accuracy and convergence. Therefore, the auto white balance adjusting system 100 has satisfactory robustness for adjusting the white balance under any environment with various light sources.

To sum up, the present invention discloses an auto white balance adjusting system and an auto white balance adjusting method. The auto white balance adjusting system can use two color spaces for adjusting the white balance of the image. The YUV color space can be used for quickly estimating and detecting feedback signals. The RGB color space can be used for quickly searching the three primary target color gains. Further, a mechanism of adaptively generating white balance gains and a mechanism of adaptively updating white pixel areas can be introduced to the auto white balance adjusting system. Therefore, the auto white balance adjusting system has satisfactory robustness for adjusting the white balance under any environment with various light sources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto white balance adjusting method comprising:
   determining a local white pixel area according to a first color temperature curve and a first brightness range of a first color space;
   determining a global white pixel area according to the first color temperature curve and a second brightness range of the first color space;
   selecting a plurality of pixels of an image according to the local white pixel area for generating a local average color value of the first color space, the local average color value being corresponding to the local white pixel area;
   selecting a plurality of pixels of the image according to the global white pixel area for generating a global average color value of the first color space, the global average color value being corresponding to the global white pixel area;
   converting the local average color value of the first color space into three primary color gains of a second color space;
   generating three primary color target gains according to the three primary color gains and a second color temperature curve of the second color space; and
   adjusting a white balance of the image frame by frame to meet the three primary color target gains according to the local average color value of the first color space and the three primary color gains of the second color space;
   wherein the first color space and the second color space are different.

2. The method of claim 1, wherein the first color space is a Luminance-Chrominance color space, and the second color space is a three primary color space.

3. The method of claim 1, wherein converting the local average color value of the first color space into the three primary color gains of the second color space comprises:
   converting the local average color value of the first color space into a red color gain, a green color gain, and a blue color gain of the second color space; and
   generating the three primary color gains of the second color space by normalizing the red color gain, the green color gain, and the blue color gain.

4. The method of claim 1, wherein generating the three primary color target gains according to the three primary color gains and the second color temperature curve of the second color space comprises:
   acquiring two distances between the three primary color gains and two nearest color temperature range boundary points of the second color temperature curve;
   generating the three primary color target gains by linearly combining the three primary color gains with two nearest color temperature range boundary points according to the two distances;
wherein the second color temperature curve is formed by a plurality of color temperature range boundary points.

5. The method of claim 1, further comprising:
setting a global white error threshold of the first color space;
acquiring a global white error when updating the global average color value while the white balance of the image is adjusted frame by frame; and
enlarging the global white pixel area and the local white pixel area when the global white error is equal to or larger than the global white error threshold.

6. The method of claim 5, further comprising:
setting a white pixel target value of the first color space when the global white error is smaller than the global white error threshold;
acquiring a local white error between the local average color value and the white pixel target value; and
enlarging the local white pixel area when the local white error is equal to or larger than a local white error threshold.

7. The method of claim 5, further comprising:
setting a white pixel target value of the first color space when the global white error is smaller than the global white error threshold;
acquiring a local white error between the local average color value and the white pixel target value; and
reducing the local white pixel area when the local white error is smaller than a local white error threshold.

8. The method of claim 1, further comprising:
acquiring previous three primary color target gains;
acquiring updated weightings;
generating updated gains according to the three primary color target gains, the updated weightings, and the previous three primary color target gains.

9. The method of claim 8, wherein the updated weightings are determined according to a distance between the previous three primary color target gains and the three primary color target gains, a look-up table, or a predetermined value.

10. The method of claim 1, wherein the local white pixel area is within the global white pixel area.

11. An auto white balance adjusting system comprising:
an image capturing device configured to acquire an image;
a memory configured to save data;
an output device configured to output an image with an adjusted white balance; and
a processor coupled to the image capturing device, the memory, and the output device and configured to control the image capturing device, the memory, and the output device;
wherein after the image capturing device acquires the image, the processor determines a local white pixel area according to a first color temperature curve and a first brightness range of a first color space saved in the memory, the processor determines a global white pixel area according to the first color temperature curve and a second brightness range of the first color space saved in the memory, the processor selects a plurality of pixels of an image according to the local white pixel area for generating a local average color value of the first color space, the local average color value corresponds to the local white pixel area, the processor selects a plurality of pixels of the image according to the global white pixel area for generating a global average color value of the first color space, the global average color value corresponds to the global white pixel area, the processor converts the local average color value of the first color space into three primary color gains of a second color space, the processor generates three primary color target gains according to the three primary color gains and a second color temperature curve of the second color space, the processor adjusts a white balance of the image frame by frame to meet the three primary color target gains according to the local average color value of the first color space and the three primary color gains of the second color space, the processor controls the output device for outputting the image with the adjusted white balance, and the first color space and the second color space are different.

12. The system of claim 11, wherein the first color space is a Luminance-Chrominance color space, and the second color space is a three primary color space.

13. The system of claim 11, wherein the processor converts the local average color value of the first color space into a red color gain, a green color gain, and a blue color gain of the second color space, and the processor generates the three primary color gains of the second color space by normalizing the red color gain, the green color gain, and the blue color gain.

14. The system of claim 11, wherein the processor acquires two distances between the three primary color gains and two nearest color temperature range boundary points of the second color temperature curve, the processor generates the three primary color target gains by linearly combining the three primary color gains with two nearest color temperature range boundary points according to the two distances, and the second color temperature curve is formed by a plurality of color temperature range boundary points.

15. The system of claim 11, wherein the processor sets a global white error threshold of the first color space, the processor acquires a global white error when updating the global average color value while the white balance of the image is adjusted frame by frame, and the processor enlarges the global white pixel area and the local white pixel area when the global white error is equal to or larger than the global white error threshold.

16. The system of claim 15, wherein the processor sets a white pixel target value of the first color space when the global white error is smaller than the global white error threshold, the processor acquires a local white error between the local average color value and the white pixel target value, and the processor enlarges the local white pixel area when the local white error is equal to or larger than a local white error threshold.

17. The system of claim 15, wherein the processor sets a white pixel target value of the first color space when the global white error is smaller than the global white error threshold, the processor acquires a local white error between the local average color value and the white pixel target value, and the processor reduces the local white pixel area when the local white error is smaller than a local white error threshold.

18. The system of claim 11, wherein the processor acquires previous three primary color target gains, the processor acquires updated weightings, and the processor generates updated gains according to the three primary color target gains, the updated weightings, and the previous three primary color target gains.

19. The system of claim 18, wherein the updated weightings are determined according to a distance between the previous three primary color target gains and the three primary color target gains, a look-up table, or a predetermined value.

20. The system of claim 11, wherein the local white pixel area is within the global white pixel area.

* * * * *